US009808959B2

(12) United States Patent
Molitor et al.

(10) Patent No.: US 9,808,959 B2
(45) Date of Patent: Nov. 7, 2017

(54) CONCRETE SLAB FORMING METHOD

(71) Applicants: Peter Molitor, Andale, KS (US); Richard Raphael Mfuko, Wichita, KS (US)

(72) Inventors: Peter Molitor, Andale, KS (US); Richard Raphael Mfuko, Wichita, KS (US)

( * ) Notice: Subject to any disclaimer, the term of this patent is extended or adjusted under 35 U.S.C. 154(b) by 543 days.

(21) Appl. No.: 14/466,339

(22) Filed: Aug. 22, 2014

(65) Prior Publication Data

US 2014/0361454 A1   Dec. 11, 2014

(51) Int. Cl.
| | | |
|---|---|---|
| *B28B 11/08* | (2006.01) | |
| *E01C 7/14* | (2006.01) | |
| *E04F 21/24* | (2006.01) | |
| *B29L 7/00* | (2006.01) | |

(52) U.S. Cl.
CPC ............ *B28B 11/0809* (2013.01); *E01C 7/14* (2013.01); *E04F 21/245* (2013.01); *B29L 2007/002* (2013.01)

(58) Field of Classification Search
CPC .................................................. B28B 11/0809
See application file for complete search history.

(56) References Cited

U.S. PATENT DOCUMENTS

| | | | |
|---|---|---|---|
| 2,396,426 | A | 3/1946 | Jackson |
| 5,643,509 | A | 7/1997 | Ytterberg et al. |
| 2011/0135388 | A1 | 6/2011 | Quenzi et al. |
| 2014/0361454 | A1 | 12/2014 | Molitor et al. |

OTHER PUBLICATIONS

Naidu, et al. A study on strength properties of roller compacted concrete with 30% replacement of OPC 53 grade cement by flyash. International Journal of Computational Engineering Research. May-Jun. 2012. vol. 2. Issue No. 3. pp. 912-9181.
Harrington, et al. Guide for Roller-Compacted Concrete Pavements. National Concrete Pavement Technology Center. Aug. 2010.
Author: Carl O. Peterson; Title of article: "Power Floating and Troweling"; Title of item: Article: Date of item: 1986; pp. 1-3, Volume-issue number(s): N.A.: Publisher: The Aberdeen Group; City and/or country where published: U.S.
Author: Dale Harrington, et al; Title of article: Guide For Roller-Compacted Pavements; Title of item: Manual; Date of item: Aug. 2010; pp. 1-114; Volume-issue number(s): N.A.; Publisher: National Concrete Pavement Technology Center; City and/or country where published: Ames, Iowa.

*Primary Examiner* — Larry Thrower

(57) ABSTRACT

A method for fabricating a concrete slab upon a surface, the concrete slab having a final thickness and having, upon drying, a maximum dry density, the method including steps of providing a body of no-slump concrete, the no-slump concrete including a combination of aggregate and paste; dispensing the no-slump concrete upon the surface in an even depth layer which has an upper surface and includes an air volume, a portion of the paste residing at an upper surface of the even depth layer; removing a portion of the air volume from the no-slump concrete layer by compaction; trowel mulching the paste which resides at the upper surface; and trowel transporting the mulched paste horizontally over the upper surface to form a smooth concrete paste upper slab surface.

16 Claims, 6 Drawing Sheets

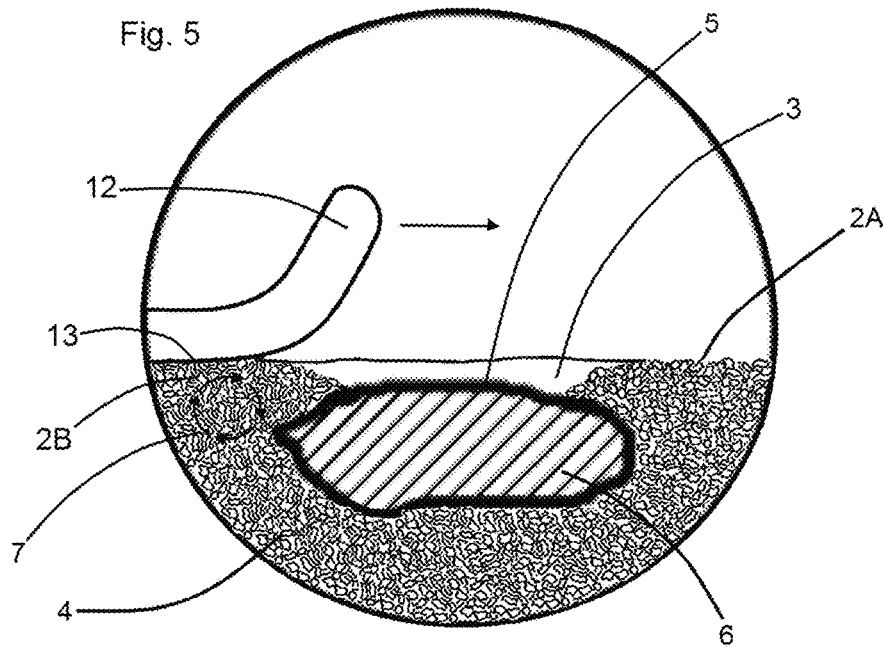
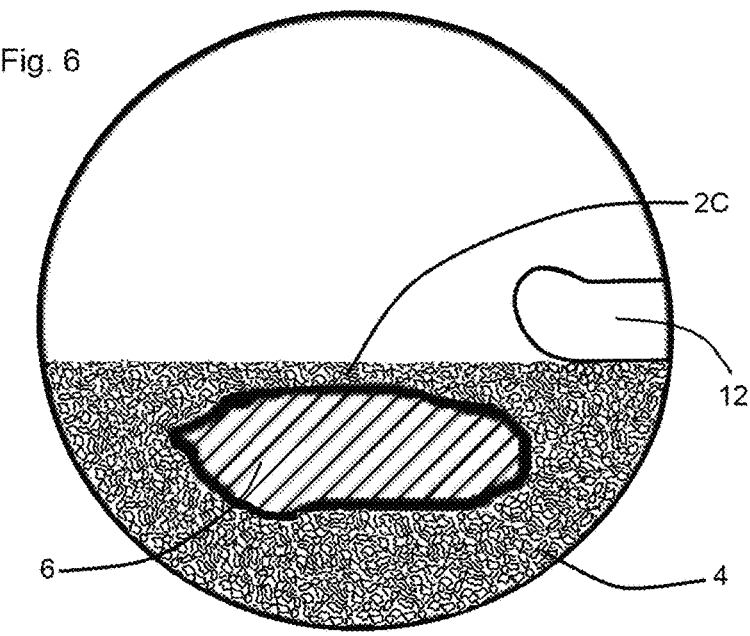

CONCRETE SLAB FORMING METHOD

CLAIM OF PRIORITY FROM PREVIOUSLY FILED PROVISIONAL PATENT APPLICATION

This non-provisional patent application claims the benefit of and priority from U.S. provisional patent application No. 61/914,123 filed Dec. 10, 2013. The inventors disclosed in and the applicant of said provisional application are one and the same as those of the instant application. The Specification and drawings of said provisional application are substantially identical to those of the instant application.

FIELD OF THE INVENTION

This invention relates to formation of useful articles of synthetic stone or concrete. More particularly, this invention relates to formation of concrete slabs in the form of roadways, foundation floors, patios, tarmacs and the like.

BACKGROUND OF THE INVENTION

During the phase of hydration of concrete or Portland Cement which is commonly known as the stage II or dormant phase (such phase following a short stage I or aluminite $C_3A$ phase in which Ettringite crystals form) the concrete mixture passes through varying consistencies which affect workability. Typically, during the first half of the approximate two hour long dormant phase, the concrete mix remains highly workable and is capable of being poured into concrete forms. Also during such phase interval, the concrete mix is capable of removal of interior air pockets and voids through agitation. During the latter portion of the first half of the dormant phase, the mix is capable of surface smoothing via floatation troweling wherein liquid eddy currents induced by over passage of a flat trowel carry a skim layer of fine grained concrete paste over any rough aggregate which may reside at the slab's surface.

During the second half (or approximate second hour) of the concrete mix's dormant phase, the mix attains a "no-slump" consistency. Upon providing a hollow 18" cone concrete form having an open 8" diameter base, then filling such cone with early dormant phase concrete to a depth of 12", then allowing the concrete set for a period of time, and then upwardly removing such cone from the concrete, the upper surface of such concrete (a 4" diameter circular face) may "slump" or deflect downwardly a distance which is dependent to the level of set of the concrete. A downward deflection of such concrete upper surface in excess of ¼" indicates that the removal of the conical form has occurred prior to the concrete's attainment of a "no-slump" consistency. If the concrete is "no-slump" when the form is removed, it will remain as an intact casting of the cone's interior which retains at least 98% of its originally cast height. The above described concrete working steps of pouring the mix into concrete forms, agitating the concrete to remove entrained air, and liquid float troweling the surface typically must occur prior to the concrete's setting progression to a no-slump consistency.

Nevertheless, no-slump consistency concrete may be worked in a different manner by providing a no-slump mix which comprises loosened mulch (referred to in the industry as roller compactible concrete-RCC) and by drop spreading such loose mix over the ground in an even depth layer. Such drop spreading of loosened or mulched no-slump concrete may advantageously proceed in a manner similar to the action of a common asphalt paving machine upon loose granular asphalt which is thereby conveyed from a forward hopper to a lateral dispersion auger which evenly laterally disperses the granular asphalt to rearwardly drop to the ground in an even depth layer. Upon use of such asphalt paving machinery for alternative drop spreading no-slump concrete in an even depth layer over a ground surface, the initially resulting concrete layer differs markedly from a form poured layer of pre-no-slump concrete. One major difference between the two modes of slab formation relates to air entrainment levels. Drop spread no-slump concrete typically includes a large amount of entrained air pockets which, if not removed, would produce a hardened concrete slab far weaker than conventional poured concrete. Concrete poured into forms prior to its no-slump phase includes relatively few strength degrading air pockets.

The multiplicities of entrained air pockets which commonly reside within a freshly drop spread layer of no-slump concrete necessitate that means be employed to remove the layer's air pockets prior to concrete's entry into phase III hardening. Such means typically comprise mechanical compaction of the no-slump concrete layer. Such compaction step may suitably be executed through the actions of vibratory rollers, vibratory tampers, reciprocating tampers, or vibratory screeds. Where a paving machine is utilized for executing the above described no-slump concrete drop spreading step, such compacting machinery may be conveniently and advantageously mounted upon and deployed thereon immediately rearwardly from the machine's output port. Suitably, separately deployed compacting equipment may be alternatively used.

Upon mechanical compaction of a drop spread layer of no-slump concrete, and upon removal of substantially all of such layers' entrained air pockets, phase III hardening of the concrete may proceed in a normal fashion to produce concrete slab having a strength equal to or greater than that of a conventionally poured concrete slab. However, upon such compaction and hardening, further drawbacks or disadvantages relative to conventionally poured concrete slabs are experienced.

Upon such drop spreading, compaction, and hardening of a no-slump concrete slab, multiplicities of surface imperfections resulting from exposed aggregate edges and resulting from marring or lining of surfaces at tamper or roller edges commonly remain. Unlike conventional poured concrete slabs which allow for trowel actuated liquid floatation surfacing, liquid floatation surfacing of a mechanically compacted no-slump concrete slab surface is not possible. In its no-slump state, such compressed concrete layer lacks sufficient moisture for the induction of any surface level fluid currents, frustrating any effort at floatation troweling.

Compacted no-slump concrete slabs are known to be rough and unsightly, and marked difficulties have been encountered in the concrete fabrication industry in properly surfacing such slabs.

The instant inventive method solves or ameliorates the problems, defects, and deficiencies noted above by providing apparatus and method steps which re-mulch and distribute over the surface of a compacted no-slump concrete slab a portion of the concrete's paste, such re-mulching and distribution of paste creating a smooth slab top surface.

BRIEF SUMMARY OF THE INVENTION

A first step of the instant inventive method comprises providing a body of no-slump concrete, preferably RCC roller compactable concrete. In the preferred mode of performance, the no-slump concrete body has a saturated surface-dry condition which includes a mixture of aggregate having a normal diameter ranging from ¼" to 2", the aggregate preferably being dispersed through the no-slump concrete mixture at between 145-675 lbs. per cubic yard of cementitious material. Also, in the preferred mode of performance, between 4.% and 9% of the unit weight of the provided no-slump concrete constitutes potable water.

In a preferred mode of performance of the instant inventive method, the provided body of no-slump concrete is initially stored and retained within a "V" shaped hopper with mechanically tiltable side walls, such hopper having a continuous loop scraper belt at its lower vertex. Suitably, such hopper may be of the type commonly mounted to the front end of a mobile asphalt road paving machine.

In a further step of the instant inventive method, the no-slump concrete is dispensed or drop spread over the ground in an even depth layer, such layer slightly exceeding an intended final thickness of a concrete slab the fabrication of which is the object of the instant inventive method. In a preferred mode of performance of the method, such no-slump concrete drop spreading step emits the concrete from a laterally and horizontally extending output port. Assuming that the no-slump concrete is conveyed by a hopper mounted continuous loop scraper belt, fins or ridges upon such belt have an effect of mulching or loosening the concrete while carrying the concrete rearwardly toward the machine's output port. To assure that such conveyed concrete is evenly dispersed along the length of the horizontal output port, rotating augers may be mounted over such port, such augers advantageously further mulching the no-slump concrete prior to drop spreading.

A further preferred step of the instant inventive method comprises employment of means for reducing and eliminating entrained air from the drop spread layer of mulched no-slump concrete. In a suitable mode of performance of the method, a heavy vibratory roller may be rolled over the upper surface of the concrete layer, such rolling action compacting the concrete and forcing entrained air out of the concrete. Suitably, such compacting step may be performed by a vibratory and/or tamping screed mounted to the rear of a paving machine. In order to assure suitable final concrete slab strength, the compacting step preferably compresses the no-slump concrete layer to a density which is at least 95% of the concrete's maximum dry density.

In the event of a termination of performance of the steps of the instant inventive method upon completion of its mulching, drop spreading and compacting steps, an undesirably marred or defaced upper slab surface would likely result. Accordingly, performance of the subsequent method steps described below is desirable.

The further and subsequent steps of the instant inventive method comprise re-mulching small upper portions of the concrete layer's no-slump paste (such paste including fine grained sand and surrounding the concrete mix's larger aggregate) and horizontally transporting such re-mulched paste over and into pockets or voids at and about any exposed surface aggregate. Such transportation of re-mulched no-slump paste advantageously forms an even and smooth paste layer at all locations at the surface of the slab, and fills and cures all marring and defacing pockets, ridges, and voids within such slab.

In a preferred mode of performance of the instant inventive method, such horizontal transportation of re-mulched no-slump paste is induced or actuated via sliding horizontal movements of trowel blades over the slab surface. Such sliding contact advantageously causes portions of the no-slump paste which contact the undersurface of such trowel blade to temporarily adhere thereto, and to horizontally roll therealong in a paste re-mulching fashion. When portions of such re-mulched paste meet a pocket or void, such paste is downwardly deposited therein, advantageously filling the pocket or void. Upon such deposit and void filling, the trowel blade substantially simultaneously re-compacts the paste therein. In a preferred mode of performance of the instant invention, such trowel blades are rotatably or orbitally driven by a motor driven power trowel.

Accordingly, objects of the instant invention include the creation of a compacted no-slump concrete slab having a regular smooth surface through the provisions of articles, as described above, and through the execution of method and process steps, as described above.

Other objects and benefits of the instant invention will become known to those skilled in the art upon review of the Detailed Description which follows, and upon review of the appended drawings.

BRIEF DESCRIPTION OF THE DRAWINGS

FIG. 5 is a magnified view of a portion of the structure of FIG. 4 as indicated in FIG. 4.

FIG. 6 redepicts the structure of FIG. 5, the view of FIG. 6 showing passage of the trowel blade after re-mulching, spreading, depositing, and re-compacting a paste portion.

DETAILED DESCRIPTION OF PREFERRED MODES OF PERFORMANCE OF INVENTIVE METHOD

Figure 1:
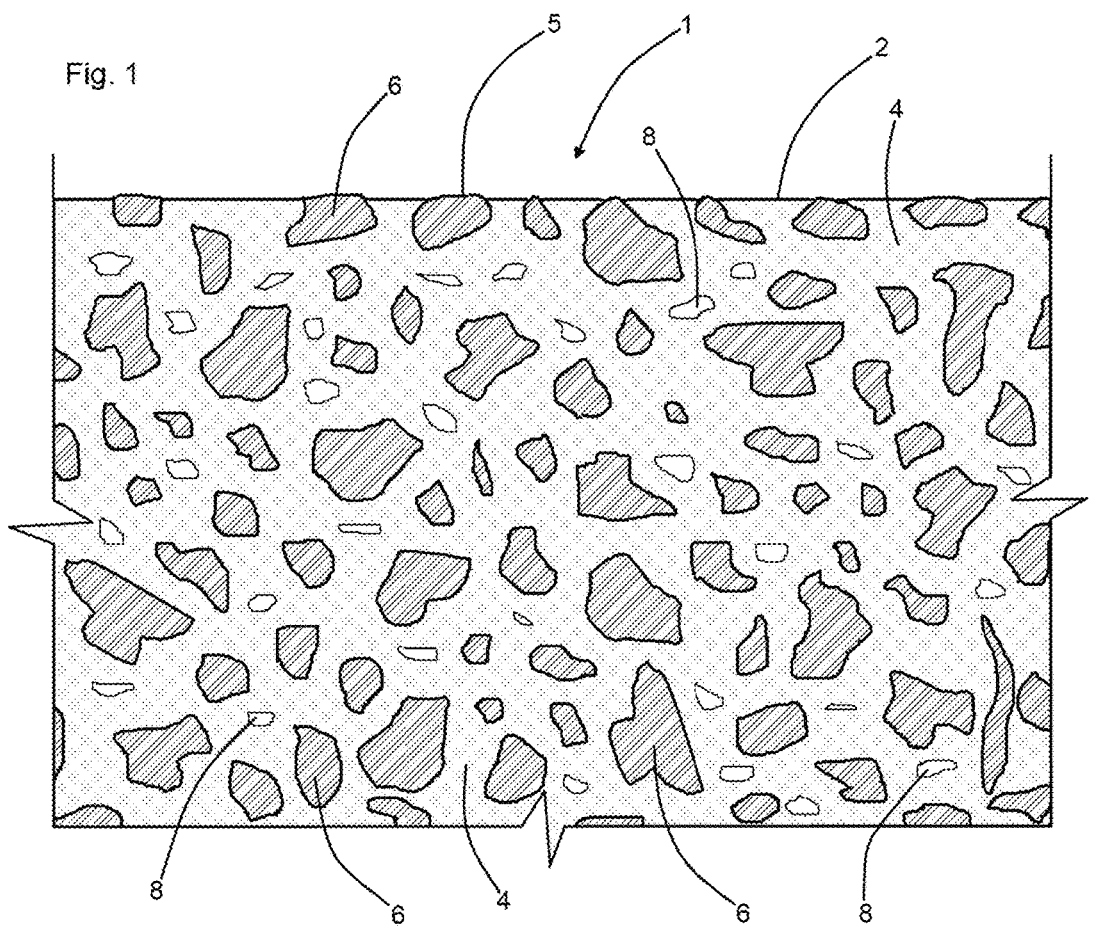
FIG. 1 is a sectional view of an initial placement of a mulched layer of no-slump concrete.

Referring now to the drawings, and in particular to Drawing FIG. 1, an initial dispersion or placement of a layer of no-slump concrete upon the ground is referred to generally by Reference Arrow 1. The no-slump concrete layer 1 has an upper surface 2, multiplicities of intermixed aggregate 6, and a matrix of concrete paste 4 which surrounds and suspends the aggregate 6.

The no-slump concrete slab 1 of FIG. 1 also includes a large volume of entrained air pockets 8, such pockets existing because, in accordance with the instant invention, the slab 1 is initially preferably drop spread upon the ground as a layer of no-slump concrete rather than via any concrete forming or pouring placement. In a preferred mode of performance of the instant inventive method, such no-slump concrete placement is effected through utilization of a paving machine of the type which performs asphalt paving and surfacing, such machine dispensing in a drop spreading fashion an even depth layer of material over the ground. Such machine dispensation mulches the no-slump concrete through the actions of the machine's continuous loop conveyors, rotary augers, and the like. As can be seen in FIG. 1, upon the initial placement of the machine mulched no-slump concrete layer 1, upper surfaces 5 of some of the aggregate particles 6 are upwardly exposed at and protrude upwardly from the upper surface 2 of the slab 1.

Figure 2:
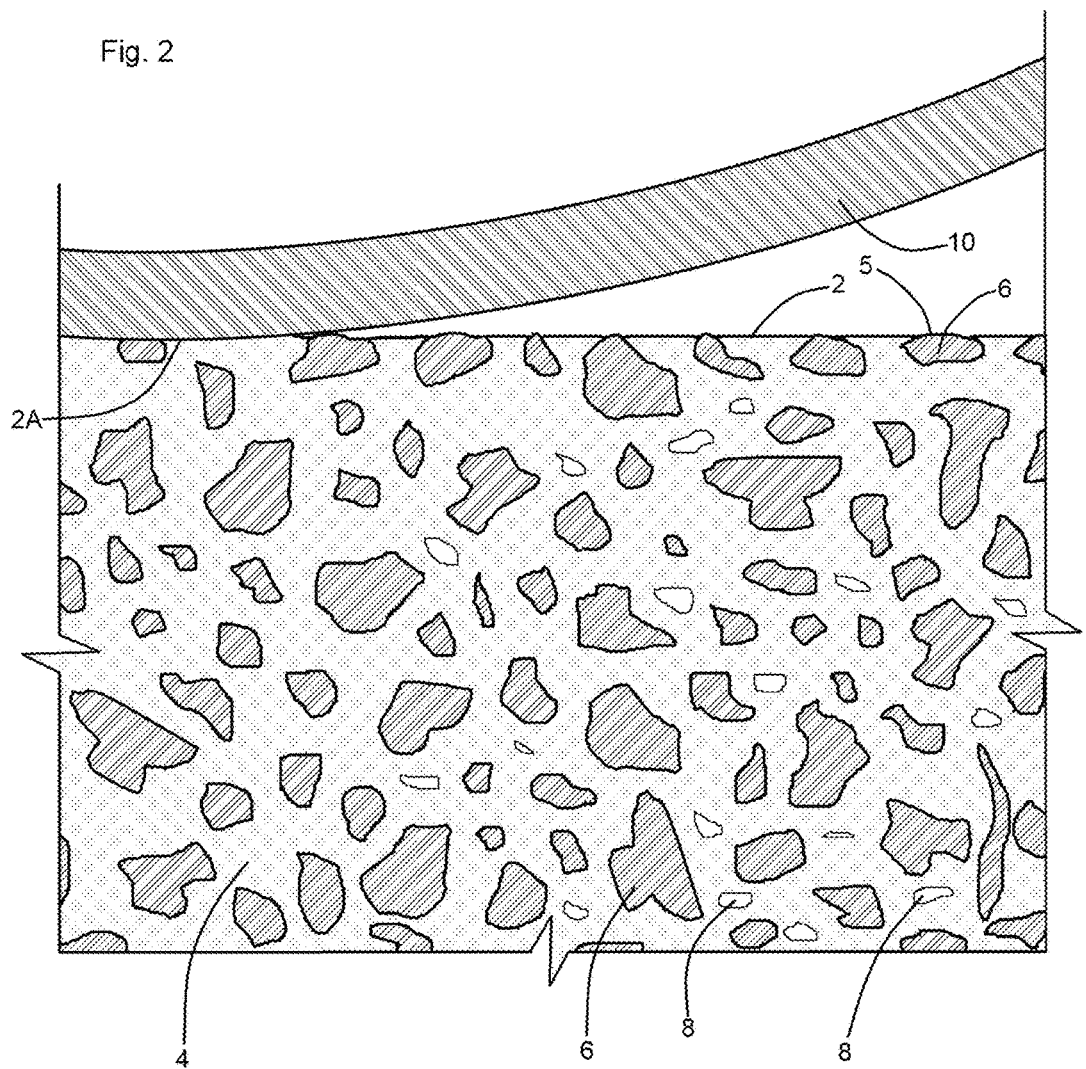
FIG. 2 redepicts the structure of FIG. 1, the view of FIG. 2 showing application of a compacting roller to the upper surface of the concrete layer.
Figure 3:
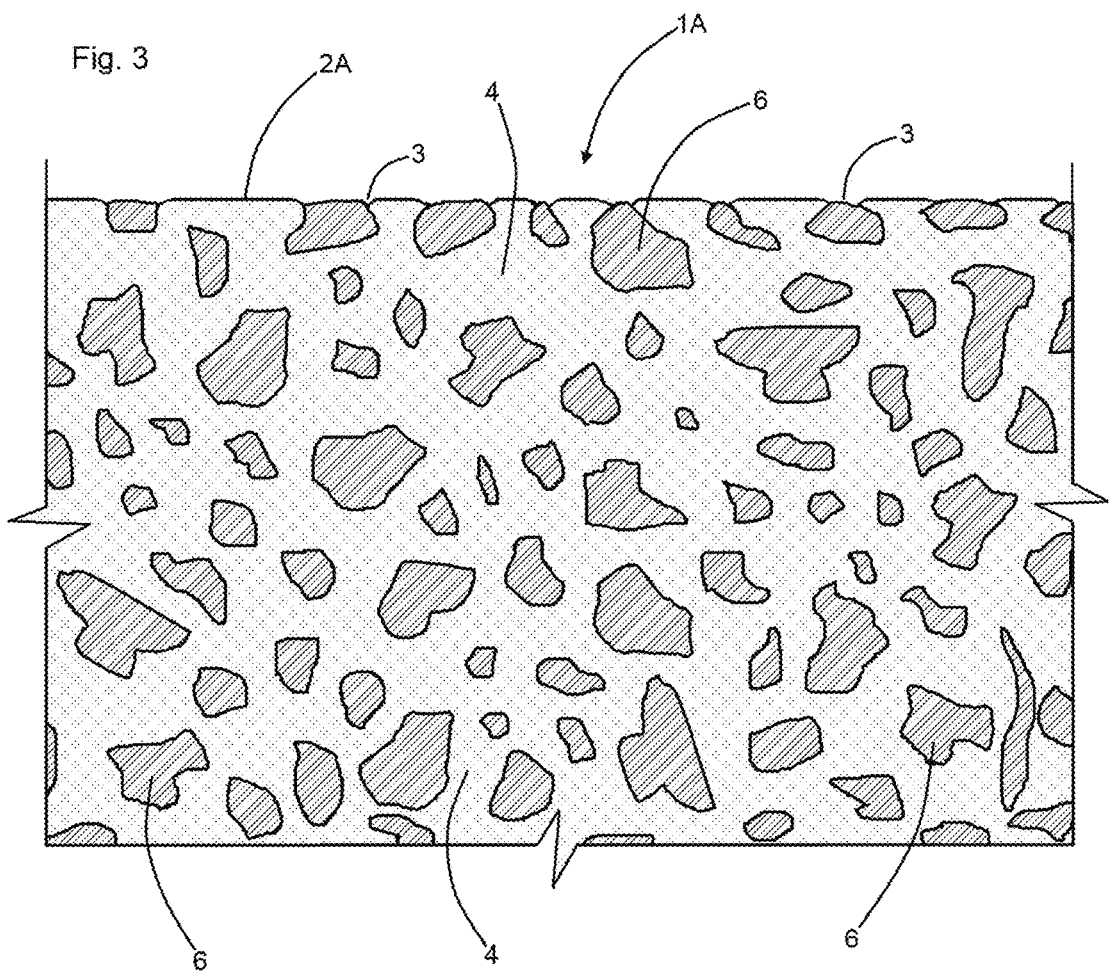
FIG. 3 redepicts the structure of FIGS. 1 and 2, the view of FIG. 3 showing a configuration subsequent to the roller compacting step.

Referring simultaneously to FIGS. 1-3, a preferred subsequent step of the instant inventive method comprises compacting the mulched no-slump concrete layer 1 in order to remove its entrained air pockets 8. In a preferred mode of performance, a heavy vibratory roller 10 may be driven over the upper surface 2 of the no-slump layer 1, such rolling compaction converting the mulched layer 1 into the compacted and entrained air removed layer 1A of FIG. 3. As can be seen in FIG. 3, following completion of the rolling compaction step, substantially all of the entrained air pockets 8 are driven out of the layer. Also, as indicated in FIG. 3, upper aggregate particles 6 are driven to or slightly below the layer's upper surface 2A, such compressing roller action commonly leaving unsightly pockets or voids 3 at and about the upper aggregate 6.

The roller compacter 10 is intended to be representative of other known modes and methods of compacting the no-slump concrete layer 1 including, but not being limited to, tamper screeds and vibratory screeds which may constitute an auxiliary trailing component of a paving machine of the type which commonly dispenses and works asphalt into asphalt slabs.

Figure 4:
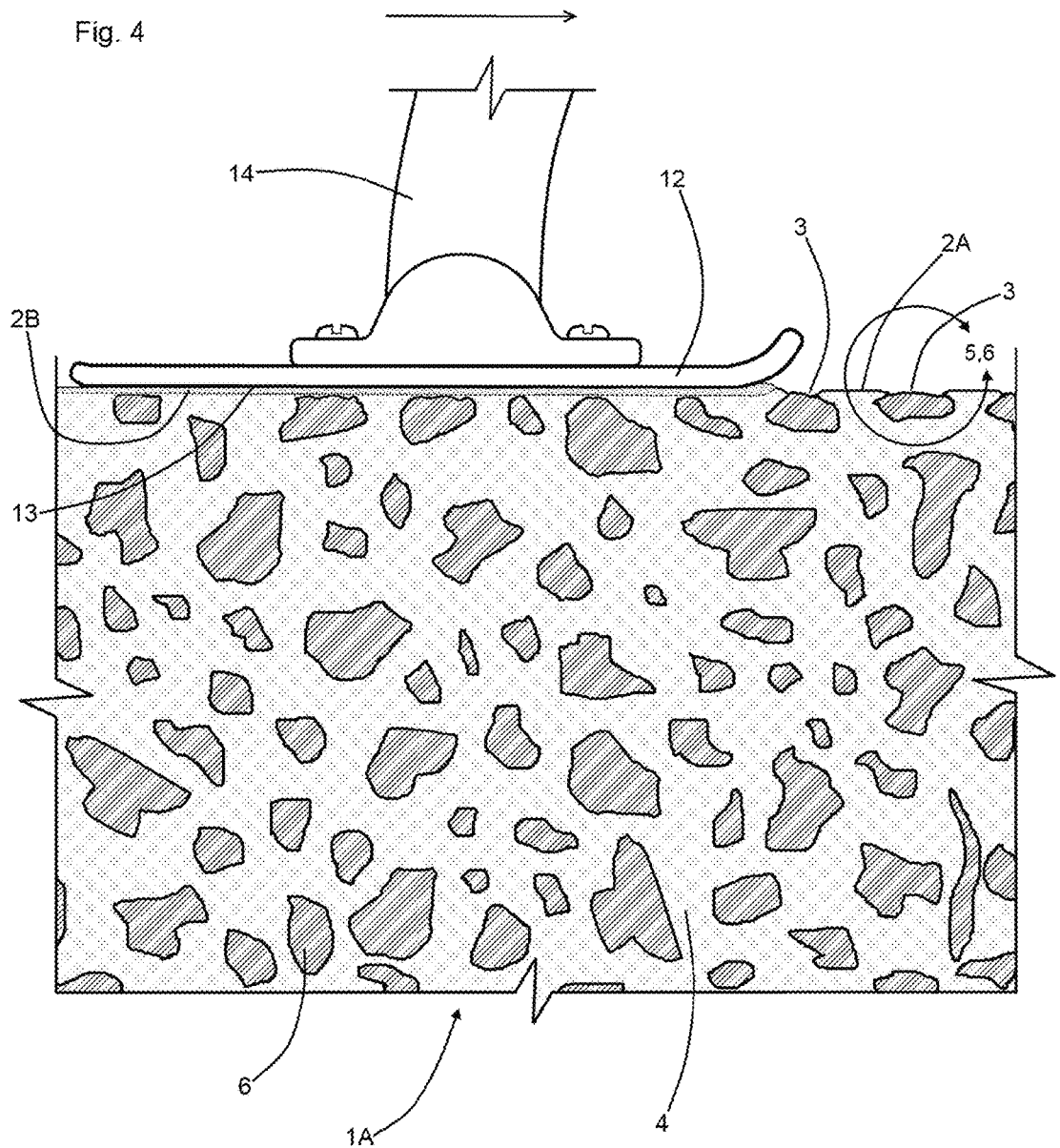
FIG. 4 redepicts the structure of FIG. 3, the view of FIG. 4 demonstrating a paste portion re-mulching step.

Further preferred steps of the instant inventive method comprise re-mulching, horizontally transporting, and re-compacting small upper portions of the paste matrix 4. Referring to FIGS. 3 and 4, the unsightly pockets and voids 3 at the upper surface 2A of the layer 1A constitute receptacles which may receive such re-mulched, transported, and re-compacted paste. Referring in particular to FIG. 4, such horizontally transported paste preferably constitutes a re-mulched or loosened paste layer 2B. In a preferred mode of performance, a rotary power trowel 14 (upper portions of such machine not being within views) is provided, such trowel 14 having and rotatably driving a radial array of trowel blades 12. Trowel blades 12 are intended as being additional representative of a unitary trowel pan attachment.

Upon downward pressing of the lower surfaces 13 of the trowel blades 12 against the upper surface 2A of compacted layer 1A, a state of adhesion or static friction advantageously exists between such surfaces. Upon simultaneous rotary movement of the trowel blades 12 as indicated by the right facing arrow drawn on FIG. 4, particles and granules of the preliminarily compacted no-slump paste 4 are simultaneously re-mulched and drawn rightwardly according to the view of FIG. 4. Referring simultaneously to FIGS. 4 and 5, such rightward re-mulching and drawing of the concrete paste 4 is represented by the cycling curved arrows 7 immediately beneath trowel blade 12. Layer 2B represents such re-mulched and horizontally transported granular portions of the no-slump paste 4.

Referring simultaneously to FIGS. 5 and 6, the re-mulched particles or granular portions 2B of the no-slump paste 4 are transported rightwardly and horizontally (in accordance with the view of FIG. 5) via the trowel blade adhesion with or static friction. Such rightward and horizontal transportation of the re-mulched no-slump paste 2B is advantageously dispensed into pockets or voids 3 which overlie surface level aggregate particles 6. Such trowel blade actuated dispensation of no-slump paste advantageously forms a smooth layer 2C of the no-slump paste 4 over the aggregate particles 6. The trailing end 12a of the trowel blade 12 substantially simultaneously re-compacts such paste layer 2C. Upon such paste dispensation and re-compacting, the upper surface 2C approximates the quality of a floatation troweled surface of a conventionally poured concrete slab.

While the undersurface 13 of trowel blade 12 does come into contact with upper surfaces 5 of exposed aggregate particles 6, adhesion and friction between the trowel blade 12 and the aggregate surfaces 5 are fortuitously (and in absence of experimental testing unexpectedly) insufficient to induce any significant horizontal movement or rolling motion of the surface level aggregate particles 6. Accordingly, the instant inventive method includes a performances by the trowel blades 12 of mechanical discriminations between the small particles and granular components of the no-slump paste 4, and the mix's larger aggregate particles 6. Such mechanical discrimination steps advantageously leave the upper aggregate particles 6 in place while a surface layer of re-mulched paste particles 4 are horizontally transported thereover. Thus, the instant inventive method advantageously allows for paste filling of pockets 3 and for re-compaction of paste within such pockets without inducing (as may be properly expected in absence of experimental testing) aggravated surface gouging through blade induced carriage and rolling movement of upper aggregate particles 6.

Figure 7:
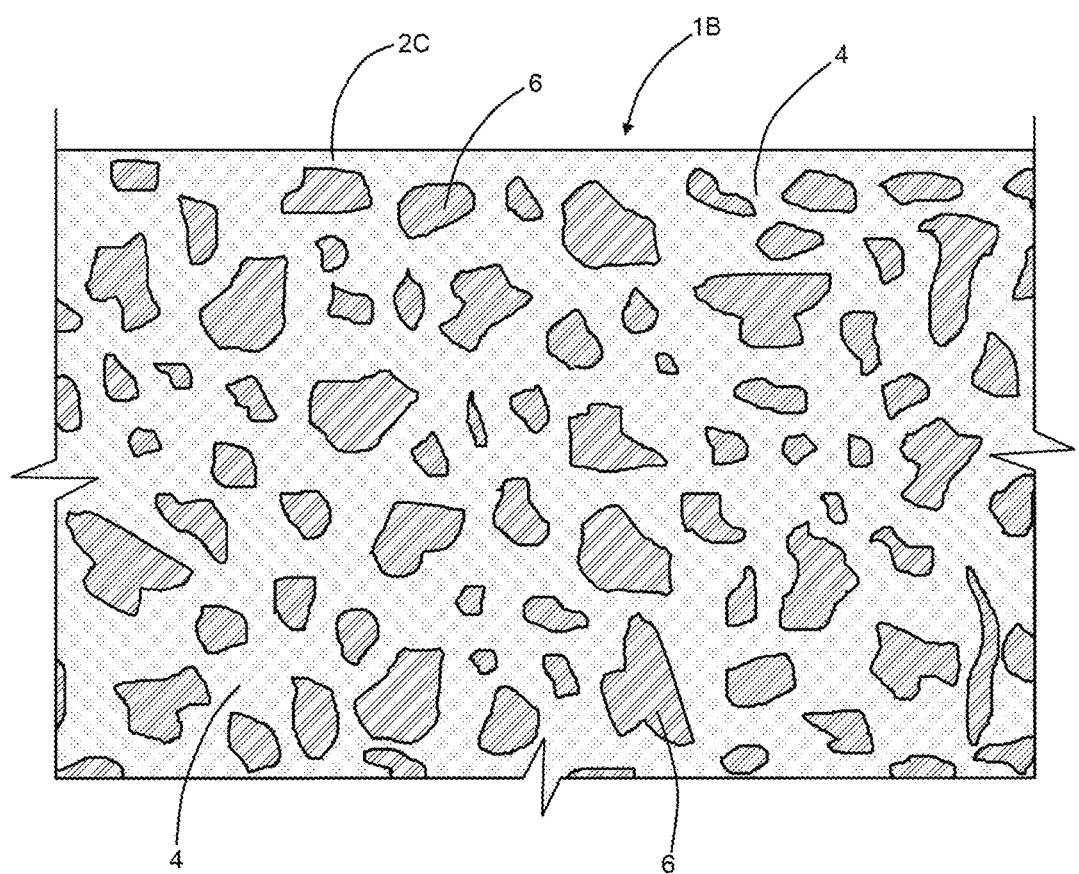
FIG. 7 redepicts the structure of FIGS. 1-6, the view of FIG. 7 showing the resultant compacted no-slump concrete slab having a smooth upper surface.

Referring simultaneously to all figures, performance of the instant inventive method advantageously transforms a machine placed body of mulched or loosened no-slump concrete 1 into the compacted slab 1B of FIG. 7, such slab 1B having a smooth and finished upper surface 2C.

While the principles of the method of the invention have been made clear in the above illustrative embodiment, those skilled in the art may make modifications to the method steps including their identity, character, and sequence of performance without departing from those principles. Accordingly, it is intended that the description and drawings be interpreted as illustrative and not in the limiting sense, and that the invention be given a scope commensurate with the appended claims.

The invention hereby claimed is:

1. A method for fabricating a concrete slab upon a surface, the concrete slab having a final thickness and having, upon drying, a maximum dry density, the method comprising steps of:
   (a) providing a body of no-slump concrete, the no-slump concrete comprising a combination of aggregate and paste;
   (b) dispensing the no-slump concrete upon the surface in an even depth layer which has an upper surface and includes a volume of air, such dispensation upwardly exposing portions of the paste;
   (c) removing a portion of the air volume from the even depth layer; and
   (d) mulching the paste exposed at the upper surface and simultaneously horizontally transporting the mulched paste over the upper surface; wherein the paste mulching and transporting steps comprise steps of providing a trowel having a lower surface, and applying the trowel to and horizontally drawing the trowel over the upwardly exposed paste so that portions of said paste roll along the trowel's lower surface.

2. The concrete slab fabrication method of claim 1 further comprising a steps of providing a mobile hopper having a lower end conveyor and having a horizontally elongated output port, and preliminarily storing the body of no-slump concrete within the mobile hopper.

3. The concrete slab fabrication method of claim 2, and wherein the step of dispensing the no-slump concrete in an even depth layer upon the surface comprises emitting the no-slump concrete from the horizontally elongated output port.

4. The concrete slab fabrication method of claim 3 wherein the body of no-slump concrete comprises roller compactable concrete.

5. The method for fabricating a concrete slab of claim 4 wherein the body of no-slump concrete body has a saturated surface-dry condition, and wherein the aggregate has a normal diameter between ¼" and 2".

6. The method for fabricating a concrete slab of claim 5 wherein the aggregate is dispersed within the body of no-slump concrete at a weight per unit volume ratio between 145 lbs. per cubic yard and 675 lbs. per cubic yard.

7. The method for fabricating a concrete slab of claim 6 wherein the body of no-slump concrete comprises water wherein the weight of the water is greater than 4% of the total weight of the body of no-slump concrete, and wherein the weight of the water is less than 9% of the total weight of the body of no-slump concrete.

8. The method for fabricating a concrete slab of claim 4 further comprising a preliminary steps of casting a portion of the no-slump concrete within a slump cone, upwardly removing the slump cone from the portion of the no-slump concrete, and confirming that such cast concrete portion slumps to a height no less than 98% of its height within the slump cone.

9. The method for fabricating a concrete slab of claim 2 further comprising operatively associating an auger with the horizontally elongated output port, and wherein the dispensing the no-slump concrete step comprises an augering dispersion of the no-slump concrete along the output port's horizontal length.

10. The method for fabricating a concrete slab of claim 1 wherein the removing a portion of the volume of air from the no-slump concrete layer comprises a step of compacting said layer.

11. The method for fabricating a concrete slab of claim 10 further comprising providing a concrete vibrating mechanism, and wherein the compacting step comprises operation of the vibrating mechanism upon the upper surface.

12. The method for fabricating a concrete slab of claim 11 wherein the operating the vibrating mechanism step compacts the no-slump concrete layer to a density which is at least 95% of the concrete's maximum dry density.

13. The method for fabricating a concrete slab of claim 11 wherein the providing a concrete vibrating mechanism comprises providing a machine selected from the group consisting of vibratory roller compactors, vibrating plate compactors, vibratory screeds, and tamper screeds, and wherein the compacting step comprises operating the selected and provided machine upon the upper surface.

14. The method for fabricating a concrete slab of claim 1 further comprising a step of forming an aggregate free paste layer over the upper surface, such layer forming step comprising the step of horizontally transporting the paste.

15. The method for fabricating a concrete slab of claim 14 wherein the upper surface comprises a multiplicity of upwardly opening concavities, and wherein the step of horizontally transporting the paste over the upper surface fills the multiplicity of upwardly opening concavities.

16. The method for fabricating a concrete slab of claim 15 wherein the step of providing a trowel comprises a provision of a rotary power trowel, and wherein the trowel applying and drawing steps comprise operating the rotary power trowel upon the upper surface.

\* \* \* \* \*

(12) INTER PARTES REVIEW CERTIFICATE (2348th)
United States Patent (10) Number: US 9,808,959 K1
Molitor et al. (45) Certificate Issued: Sep. 3, 2021

(54) CONCRETE SLAB FORMING METHOD

(71) Applicants: Peter Molitor; Richard Raphael Mfuko

(72) Inventors: Peter Molitor; Richard Raphael Mfuko

(73) Assignee: ANDALE CONSTRUCTION, INC.

Trial Number:

IPR2019-01351 filed Jul. 30, 2019

Inter Partes Review Certificate for:

Patent No.: 9,808,959
Issued: Nov. 7, 2017
Appl. No.: 14/466,339
Filed: Aug. 22, 2014

The results of IPR2019-01351 are reflected in this inter partes review certificate under 35 U.S.C. 318(b).

INTER PARTES REVIEW CERTIFICATE
U.S. Patent 9,808,959 K1
Trial No. IPR2019-01351
Certificate Issued Sep. 3, 2021

AS A RESULT OF THE INTER PARTES REVIEW PROCEEDING, IT HAS BEEN DETERMINED THAT:

Claims 1-5 and 9-16 are cancelled.

* * * * *